UNITED STATES PATENT OFFICE.

CHARLES J. NETHERCOTT, OF SALT LAKE CITY, UTAH.

COMPOSITION FOR PRESERVING CANVAS.

1,371,258. Specification of Letters Patent. Patented Mar. 15, 1921.

No Drawing. Application filed June 30, 1919. Serial No. 307,801.

*To all whom it may concern:*

Be it known that I, CHARLES J. NETHERCOTT, a citizen of the United States, residing at Salt Lake City, in the county of Salt Lake and State of Utah, have invented certain new and useful Improvements in a Composition for Preserving Canvas, of which the following is a specification.

The objects of the present invention are to treat leather, upholstering, linoleum, oil cloth, Congoleum, fluid carrying hose, cement and water bags and other like articles with my composition to render the articles waterproof and pliable and to preserve the fabric on which rubber and other compositions are carried to make hose, linoleum, Congoleum and oil cloth.

My composition consists of the following ingredients combined in the proportion stated, viz:

Five quarts of good quality varnish commonly used for outside purposes.

Three quarts of a sizing I herein call Japan sizing and which is a combination of equal parts of coach japan and Japan gold sizing. The coach japan is a composition of manganese oxid, linseed oil and naphtha and the Japan gold sizing is a composition of fossil gums, rosin, linseed oil, naphtha and manganese oxid;

Twenty-five ounces of beeswax;
Twenty-five ounces of glycerin;
Ten ounces of eucalyptus oil;
Two gallons of a thinner such as turpentine or gasolene.

These ingredients are to be thoroughly mingled by heat and agitation. To properly prepare and mix the ingredients I take two quarts of the lightest colored durable varnish for outside use, three quarts of "spar" varnish, one and one-half quarts of pale coach japan and one and one-half quarts Japan gold sizing, twenty-five ounces glycerin and ten ounces eucalyptus oil. I then shave into thin strips or small particles twenty-five ounces of beeswax which is to be added to the above liquids when the wax is melted, or it may be done by heating the wax and all of the other ingredients in the same vessel than placing the vessel in which they are to be mixed in hot or boiling water, but not over a direct fire until the wax is melted. When this mixture is cooled to lukewarm condition add the thinner of two gallons of turpentine or two gallons of gasolene and thoroughly agitate.

By using my composition I am able to treat leather, upholstering, linoleum, oilcloth, Congoleum, rubber and cotton hose, canvas, cement and water bags and shoes or rubber boots for use in water, rendering the leather, shoes, rubber boots, cement sacks and water bags waterproof, and by treating the linoleum, oil cloth and Congoleum with my composition I render them as well as the other articles just mentioned pliable and also preserve the fabric on which the hose, rubber boots, linoleum, oil cloth and Congoleum is carried.

In applying my composition to hose, or rubber goods I allow the articles to stand or be soaked therein for thirty minutes and in treating canvas and other fabrics to render it waterproof I apply the mingled ingredients with a brush giving it one coat and then after said coat has dried, which will be in about six hours, I apply another coat and allow it to dry without rubbing either coat. I advise the thorough agitation of the compound before use in order to avoid any tendency of the solids to settle in the bottom of the container, however the glycerin content will preserve the solids in a fluid and plastic condition.

I thus provide a new and novel preservative and waterproof for cement sacks, water bags, linoleum, oil cloth, Congoleum, hose and leather made into boots or shoes to render them waterproof and pliable.

Having thus described my invention I desire to secure by Letters Patent and claim:

1. A waterproofing composition consisting of five quarts of good quality varnish, three quarts Japan sizing, twenty-five ounces beeswax, twenty-five ounces glycerin, ten ounces of eucalyptus oil and two gallons of a thinner.

2. A waterproofing composition consisting of two quarts of light colored durable varnish, three quarts of spar varnish, one and one-half quarts of coach japan, one and one-half quarts of Japan sizing, twenty-five ounces of melted beeswax, twenty-five ounces of glycerin, ten ounces of eucalyptus oil and two gallons of turpentine.

In testimony whereof I have affixed my signature.

CHARLES J. NETHERCOTT.